United States Patent [19]

Kobayashi

[11] Patent Number: 5,475,808

[45] Date of Patent: Dec. 12, 1995

[54] DISPLAY CONTROL APPARATUS

[75] Inventor: Akira Kobayashi, Tokyo, Japan

[73] Assignee: Kabushiki Kaisha Toshiba, Kawasaki, Japan

[21] Appl. No.: 910,660

[22] Filed: Jul. 8, 1992

[30] Foreign Application Priority Data

Jul. 9, 1991 [JP] Japan .................................... 3-168203

[51] Int. Cl.⁶ ...................................................... G06T 1/00
[52] U.S. Cl. ................................ 395/150; 345/3; 345/30; 345/132; 345/194
[58] Field of Search ..................................... 395/150, 151, 395/128; 345/1, 132, 127–128, 194, 3, 60, 87, 143, 129–131, 30, 33–42, 44–51, 55, 59, 98, 100, 141

[56] References Cited

U.S. PATENT DOCUMENTS

| | | | |
|---|---|---|---|
| 4,193,071 | 3/1980 | Hasegawa et al. | 340/723 |
| 4,367,466 | 1/1983 | Takeda et al. | 340/725 |
| 4,684,936 | 8/1987 | Brown et al. | 340/721 |
| 4,742,344 | 5/1988 | Nakagawa et al. | 340/723 |
| 4,831,369 | 5/1989 | Lecourtier | 340/745 |
| 4,897,799 | 1/1990 | LeGall et al. | 364/514 |
| 4,922,448 | 5/1990 | Kunieda et al. | 364/900 |
| 4,980,678 | 12/1990 | Zenda | 340/716 |
| 4,990,904 | 2/1991 | Zenda | 340/771 |
| 5,093,903 | 3/1992 | Sudoh et al. | 395/102 |
| 5,111,190 | 5/1992 | Zenda | 340/717 |
| 5,153,936 | 10/1992 | Morris et al. | 395/128 |
| 5,185,817 | 2/1993 | Degi et al. | 382/47 |
| 5,218,274 | 6/1993 | Zenda | 315/366 |
| 5,233,685 | 8/1993 | Landes et al. | 395/147 |
| 5,257,015 | 10/1993 | Inoue | 345/26 |
| 5,285,192 | 2/1994 | Johary et al. | 345/3 |
| 5,301,265 | 4/1994 | Itoh | 395/128 |
| 5,351,064 | 9/1994 | Zenda | 345/3 |

FOREIGN PATENT DOCUMENTS 0295692 12/1988 European Pat. Off. .

OTHER PUBLICATIONS

IBM Technical Disclosure Bulletin, vol. 28, No. 1, Jun. 1985, pp. 281–282.
IBM Technical Disclosure Bulletin, vol. 25, No. 5, Sep. 1982, pp. 2240–2205.
WD90C20, WD90C22 (PVGAIF) VGA Flat Panel Display Controllers, Western Digital Corp., Advance Information Aug. 9, 1991, pp. i, 6–7, 24.

*Primary Examiner*—Mark K. Zimmerman
*Assistant Examiner*—J. Feild
*Attorney, Agent, or Firm*—Finnegan, Henderson, Farabow, Garrett & Dunner

[57] ABSTRACT

When the horizontal size of a display character is given by 9 dots, 8-dot font data is stored in a font register, and 1-dot display attribute data is stored in a register. Display attribute data is data for designating the 8th dot of a character pattern to be displayed. A selector converts 9-dot data supplied from the font register and the register to serial data on the basis of a counter value of a counter and supplies the serial data to a CRT when 80 characters are to be displayed in the horizontal direction on the CRT having a horizontal resolution of 720 dots per scanning line. When an FPD having a horizontal resolution of 640 dots per scanning line is to be used, the selector converts only 8-dot font data supplied from the font register to serial data on the basis of a counter value from the counter and supplies the serial data to the FPD. As a result, eighty 8-dot characters are displayed in the horizontal direction of the FPD despite that display of 9-dot characters is designated. However, the numbers of display characters of the CRT and the FPD in the horizontal direction coincide.

12 Claims, 4 Drawing Sheets

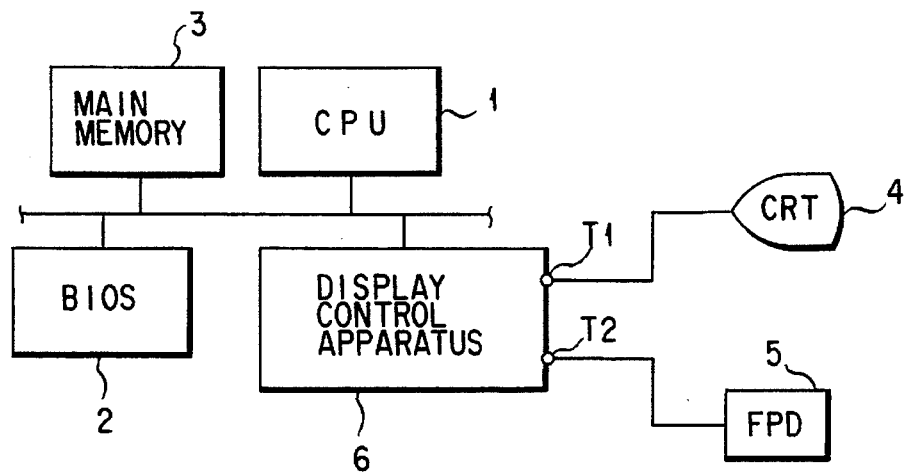
F I G. 1
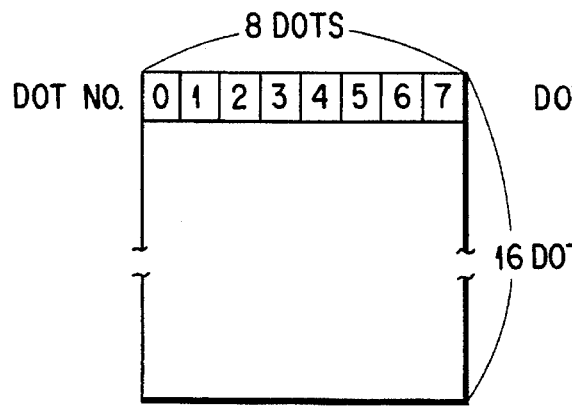
F I G. 3A
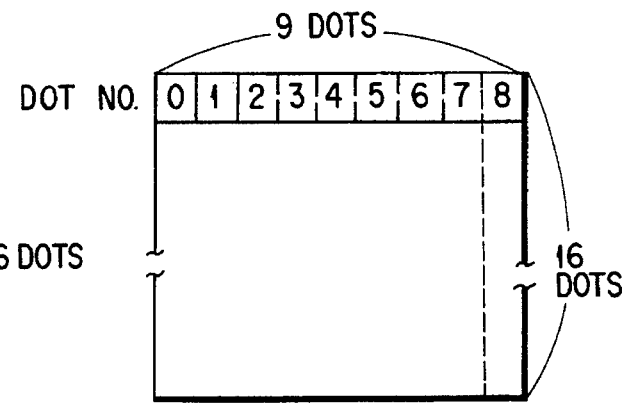
F I G. 3B
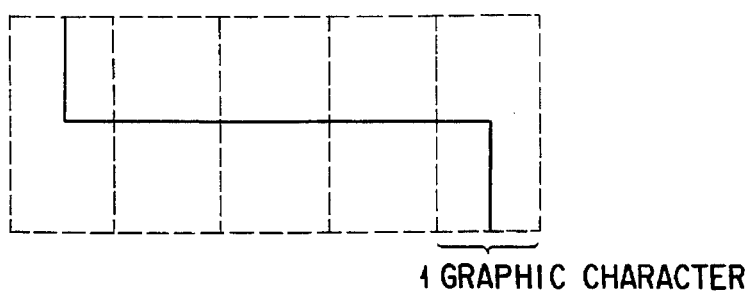
F I G. 3C

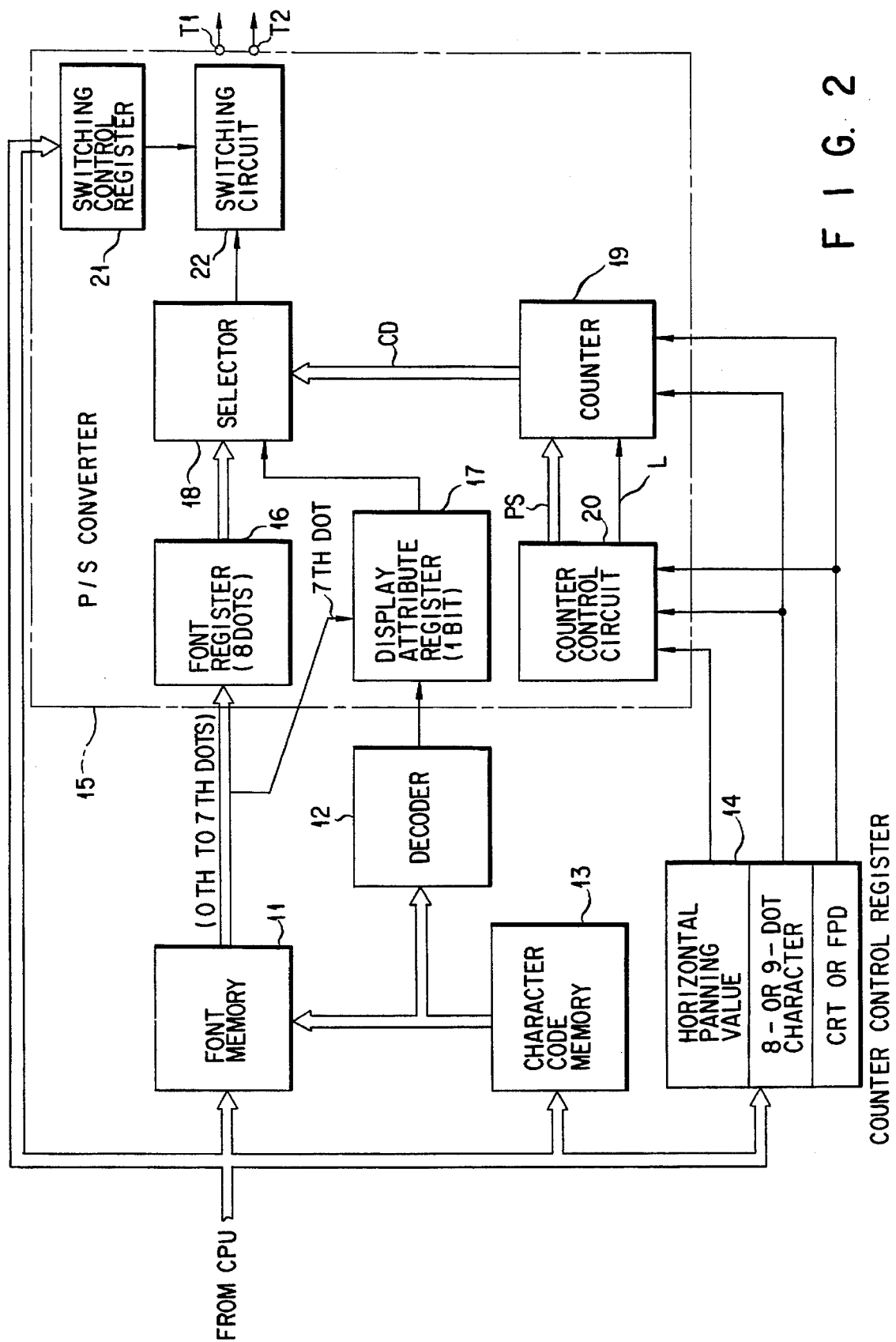

(8-DOT CHARACTER)

| HORIZONTAL PANNING VALUE | 7 | 0 | 1 | 2 | 3 | 4 | 5 | 6 |
|---|---|---|---|---|---|---|---|---|
| FIRST DISPLAY DOT | 0 | 1 | 2 | 3 | 4 | 5 | 6 | 7 |
| INITIAL VALUE | 8 | 0 | 1 | 2 | 3 | 4 | 5 | 6 |

FIG. 4A (720-DOT CRT)

| HORIZONTAL PANNING VALUE | 8 | 0 | 1 | 2 | 3 | 4 | 5 | 6 | 7 |
|---|---|---|---|---|---|---|---|---|---|
| FIRST DISPLAY DOT | 0 | 1 | 2 | 3 | 4 | 5 | 6 | 7 | 8 |
| INITIAL VALUE | 8 | 0 | 1 | 2 | 3 | 4 | 5 | 6 | 7 |

FIG. 4B (640-DOT FPD)

| HORIZONTAL PANNING VALUE | 8 | 0 | 1 | 2 | 3 | 4 | 5 | 6 | 7 |
|---|---|---|---|---|---|---|---|---|---|
| FIRST DISPLAY DOT | 0 | 1 | 2 | 3 | 4 | 5 | 6 | 7 | 7 |
| INITIAL VALUE | 8 | 0 | 1 | 2 | 3 | 4 | 5 | 6 | 6 |

FIG. 4C

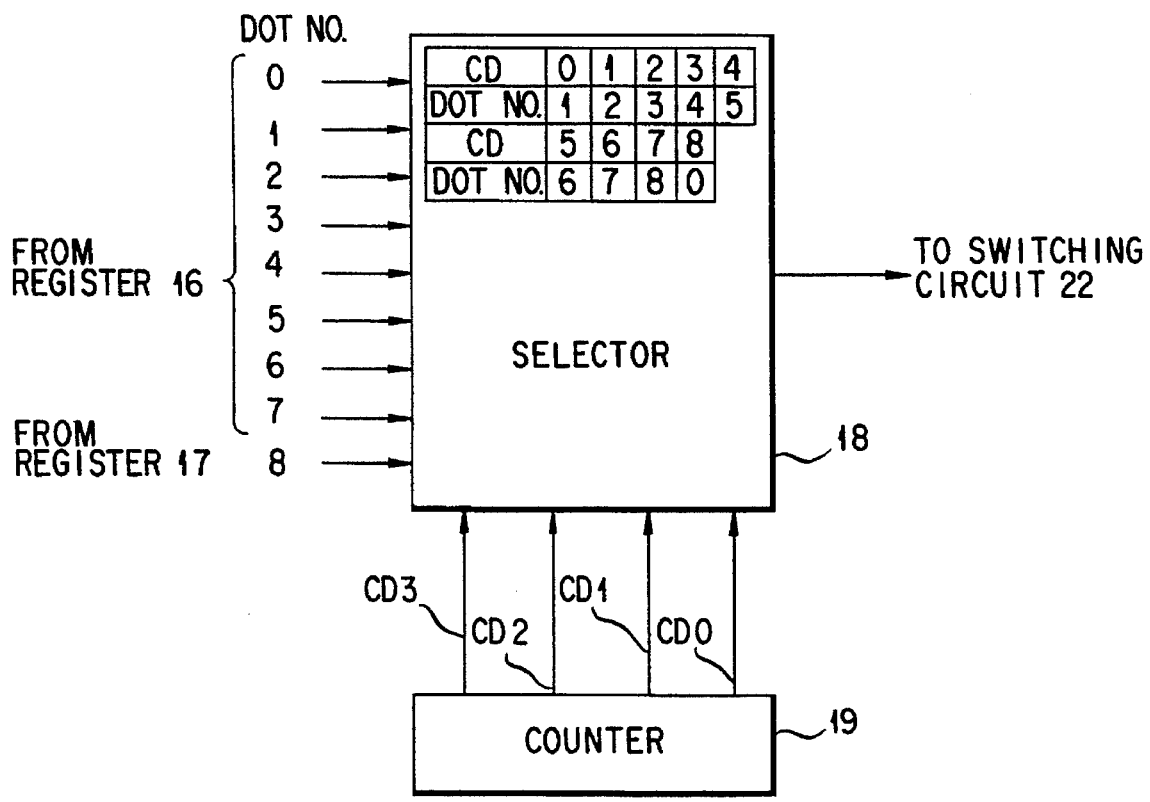
F I G. 5
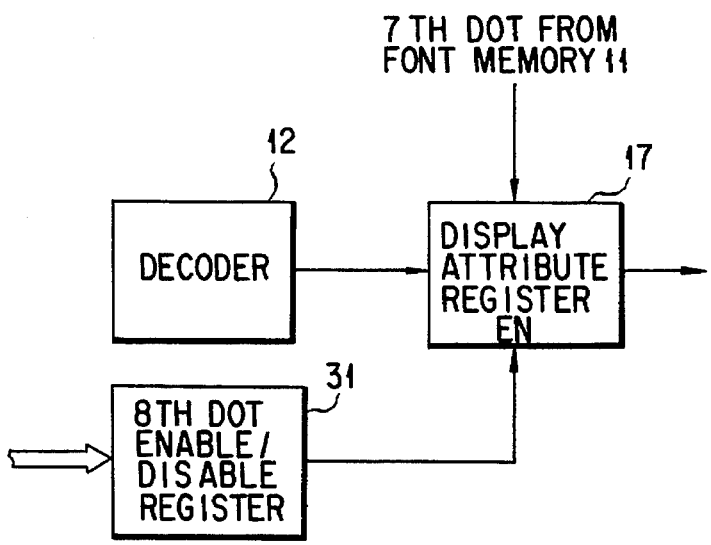
F I G. 6

DISPLAY CONTROL APPARATUS

BACKGROUND OF THE INVENTION

1. Field of the Invention

The present invention relates to a display control apparatus for commonly controlling display units having different resolutions, e.g., a display control apparatus for controlling both a CRT and a flat panel display unit.

The present invention also relates to a display control apparatus capable of causing a display unit to display characters having different sizes.

2. Description of the Related Art

Some personal computers can display an image on arbitrary display units, e.g., a CRT (Cathode Ray Tube) and an FPD (Flat Panel Display). As a display control apparatus for a personal computer of this type, one such as a VGA (Video Graphics Array) is developed. When a VGA displays a character, it selects the horizontal character size between 8 dots and 9 dots in accordance with application software setup.

The number of display characters in the horizontal direction of a display unit is determined by the horizontal character size (number of dots) and the horizontal resolution (number of dots per scanning line) of the screen. For example, when the application software sets the horizontal size of a display character to 9 dots and the horizontal resolution of the display unit is 720 dots per scanning line, a maximum of 80 characters can be displayed in the horizontal direction. However, if the horizontal size of the display character is 9 dots and the horizontal resolution of the display unit is 640 dots per scanning line, only 71 characters can be displayed in the horizontal direction, and 9 characters lack on the screen.

In this manner, in the conventional personal computer in which a plurality of types of display units can be connected, the compatibility among the display units is low, and part of a display image may be omitted.

SUMMARY OF THE INVENTION

The present invention has been made in view of the above situation, and has as its object to improve the compatibility among display units.

It is another object of the present invention to provide a technique for setting the constant number of display characters in the horizontal direction regardless of the horizontal resolution of the display unit and the size of the display character.

According to the present invention, when, e.g., the size of the display character is given by 9 dots, 9-dot font data corresponding to one character on one raster scanning line is stored in a font register means. When the horizontal resolution of the display unit is, e.g., 720 dots per scanning line and the number of display characters per line is 80 characters, a data transfer control means executes 9-dot serial conversion of the font data in the font register means in units of dots. If the horizontal resolution of the display unit is, e.g., 640 dots per scanning line, the data transfer control means deletes 1-dot font data when it performs serial conversion of the font data of the font register means in units of dots, and transfers font data as an 8-dot character per raster to the display unit.

As described above in detail, according to the present invention, the numbers of display characters in the horizontal direction of display units having different resolutions can be set equal to each other. More practically, for example, if the display character size is set in a 9-dot mode, the number of display characters in the horizontal direction of a CRT having a horizontal resolution of 720 dots per scanning line can be set equal to the number of display characters in the horizontal direction of an FPD having a horizontal resolution of 640 dots per scanning line. As a result, the compatibility among different types of display units can be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a personal computer according to an embodiment of the present invention;

FIG. 2 is a block diagram showing the configuration of a display control apparatus shown in FIG. 1;

FIG. 3A is a view for explaining a character having a horizontal character size of 8 dots;

FIG. 3B is a view for explaining a character having a horizontal character size of 9 dots;

FIG. 3C is a view for explaining a graphic character;

FIG. 4A is a table for explaining a relationship among a horizontal panning value, an initial counter value, and an initially selected dot when the horizontal size of a display character is given by 8 dots;

FIG. 4B is a table for explaining a relationship among a horizontal panning value, an initial counter value, and an initially selected dot when the operating display unit is a CRT and the horizontal size of a display character is given by 9 dots;

FIG. 4C is a table for explaining a relationship among a horizontal panning value, an initial counter value, and an initially selected dot when the operating display unit is an FPD and the horizontal size of a display character is given by 9 dots;

FIG. 5 is a view for explaining a relationship between counter outputs CD0 to CD3 and data selected by a selector shown in FIG. 2; and FIG. 6 is a block diagram showing a modification of the display control apparatus shown in FIG. 2.

DETAILED DESCRIPTION OF THE PREFERRED EMBODIMENTS

A preferred embodiment of the present invention will be described with reference to the accompanying drawings.

FIG. 1 is a block diagram showing the main part of a personal computer according to an embodiment of the present invention. This personal computer comprises a CPU 1, a BIOS memory 2, a main memory 3, a CRT (Cathode Ray Tube) 4, an FPD (Flat Panel Display) 5, and a display control apparatus 6.

The CPU 1 executes an application program stored in the main memory 3 and supplies the character code of a character to be displayed to the display control apparatus 6 in accordance with the application program. In this embodiment, the application program can designate a character having 8 dots in the horizontal direction (to be referred to as an 8-dot character hereinafter) and a character having 9 dots in the horizontal direction (to be referred to as a 9-dot character hereinafter). The CPU 1 checks the type of display unit (the CRT 4 or the FPD 5) for displaying an image thereon and connected to this personal computer in accordance with a BIOS stored in the BIOS memory 2, and supplies the result to the display control apparatus 6.

The display control apparatus 6 supplies display data to either the CRT 4 or the FPD 5 through a terminal T1 or T2 in accordance with control by the CPU 1. Both the CRT 4 and the FPD 5 need not be connected to the display control apparatus 6, and only one of them may be connected to the display control apparatus 6. In this embodiment, it is assumed that the horizontal resolution of the CRT 4 is 720 dots per scanning line and that the horizontal resolution of the FPD (e.g., a liquid display unit or a plasma display unit) 5 is 640 dots per scanning line in order to facilitate understanding.

The size of a character to be displayed will be described. In this embodiment, the application program can designate and display the character code of either a character having 8 dots in the horizontal direction or a character having 9 dots in the horizontal direction. An 8-dot character is a character expressed by 8 dots in the horizontal direction and, e.g., 16 dots in the vertical direction, as shown in FIG. 3A. A 9-dot character is a character expressed by 9 dots in the horizontal direction and, e.g., 16 dots in the vertical direction, as shown in FIG. 3B. A 9-dot character consists of an 8-dot character and the 9th dot at the right end. When a character to be displayed is a graphic character, the 9th dot becomes identical to the 8th dot; when a character to be displayed is a normal character, the 9th dot represents a background color. Graphic characters are, e.g., rules or lines to form an image by a combination as shown in FIG. 3C, and marks and images. In FIG. 3C, each dotted square indicates one graphic character.

The display control apparatus 6 has a CRT font memory 11, a decoder 12, a character code memory 13, a counter control register 14, a parallel/serial converter (P/S converter) 15, a switching control register 21, and a switching circuit 22, as shown in FIG. 2.

The character code memory 13 stores a character code supplied from the CPU 1 in the form of an array to be displayed on the screen. The character code memory 13 reads out the character codes stored in it in the order of display and supplies them to the font memory 11. A current scanning line number is also supplied to the font memory 11 from a scanning number register (not shown) in a display controller. The font memory 11 generates character patterns (dot patterns) for one-raster scanning (each has 8 dots) in a parallel manner, in response to the character codes and the scanning line number.

The decoder 12 decodes a character code output from the character code memory 13 to generate attribute data including one bit display attribute data (1 bit). The display attribute data is data for designating whether the character code represents a graphic character.

The counter control register 14 stores display control data supplied from the CPU 1. More particularly, the counter control register 14 stores data indicating whether the operating display unit is the CRT 4 or FPD 5, data indicating whether the size (number of dots in the horizontal direction) of a display character is 8 or 9, and a horizontal panning value. Horizontal panning is a function of shifting an image to be displayed in the horizontal direction in units of dots. A horizontal panning value indicates a shift amount (number of dots). The horizontal panning value is set by, for example, an operator's predetermined key operation. When the character is a 9-dot character, the horizontal panning value can take a value from 0 to 8; when the character is an 8-dot character, it can take a value from 0 to 7. If further shifting is necessary, the read address of the character code memory 13 in the horizontal direction is updated as required.

The P/S converter 15 has a font register 16, a display attribute register 17, a selector 18, a counter 19, and a counter control circuit 20. The font register 16 stores a character pattern (8 dots=8 bits) of one-raster scanning supplied from the font memory 11.

The display attribute register 17 is a 1-bit register for storing the 8th dot (last dot; see FIG. 3B) of a 9-dot character. In accordance with display attribute data supplied from the decoder 12, the display attribute register 17 holds the 7th dot of data supplied from the font memory 11 when the display character is a graphic character, and holds predetermined data corresponding to the space when the display character is a normal character.

The counter control circuit 20 generates an initial value PS in response to data supplied from the display control register 14 and supplies it to the counter 19. The counter control circuit 20 also supplies a load signal L for loading the initial value PS to the counter 19 in response to updating of the horizontal panning value set in the display control register 14. As mentioned above, the horizontal panning value is set in response to operator's predetermined key operation. When the display character is an 8-dot character, the initial value PS is set as shown in FIG. 4A in accordance with the horizontal panning value. When the display character is an 9-dot character and the display unit is the CRT 4 (horizontal resolution is 720 dots per scanning line), the initial value PS is set as shown in FIG. 4B in accordance with the horizontal panning value. When the display character is a 9-dot character and the display unit is the FPD 5 (the horizontal resolution is 640 dots per scanning line), the initial value PS is set as shown in FIG. 4C in accordance with the horizontal panning value. The initial value PS is changed in accordance with the horizontal panning value. The first display dot of the first display character (the leftmost character in a screen) is selected in accordance with the set initial value PS. FIGS. 4A to 4C show relationships between, the horizontal scanning values, the initial values set in response to the horizontal scanning values and the first display dots selected in response to the initial values.

The counter 19 loads the initial value PS in response to the load signal L from the counter control circuit 20 and updates and outputs a 4-bit counter value CD (CD0 to CD3) in accordance with data supplied from the display control register 14 and in response to an external clock signal.

More specifically, when the display character is a 9-dot character and the display unit is the CRT 4, the counter 19 counts up the counter value CD starting from the initial value PS. When the counter value CD reaches 8, the counter 19 is reset to start counting from 0 again. For example, when the initial value PS is 5, the counter 19 updates the counter value like, 6, 7, 8, 0, 1, 2, 3, 4, 5, 6, 7, 8, 0, 1, . . . . When the display character is an 8-bit character, and when the display character is a 9-bit character and the display unit is the FPD 15, the counter 19 counts up the counter value CD starting from the initial value PS. In this case, the counter 19 skips 7. When the counter value reaches 8, the counter 19 is reset to start counting from 0 again. For example, when the initial value PS is 5, the counter 19 updates the counter value like 6, 8, 0, 1, 2, 3, 4, 5, 6, 8, 0, 1, . . . .

The selector 18 comprises a gate circuit group constituting a multiplexer. The selector 18 selectively outputs dot data from the font register 16 and the display attribute register 17 in accordance with the counter value CD output from the counter 19, as shown in FIG. 5.

The switching control register 21 is a register in which data indicating the operating one of the CRT 4 and the FPD 5 is set by the CPU 1. The switching circuit 22 outputs serial data supplied from the P/S converter 22 to either the CRT 4 or FPD 5 through either the terminal T1 or T2 in accordance with the data held in the switching control register 21.

The operation of the personal computer having the arrangement shown in FIGS. 1 and 2 will be described in detail.

When the power switch of this personal computer is turned on, the CPU 1 executes the BIOS stored in the BIOS memory 2 to discriminate whether the operating display unit is the CRT 4 or FPD 5. The CPU 1 sets the discrimination result in the counter control register 14 and the switching control register 21. Then, when the operating display unit is switched by, e.g., a keyboard operation, the CPU 1 updates the contents of the counter control register 14 and the switching control register 21 in accordance with the BIOS.

(Operation when the CRT 4 is operating and display of 9-dot characters is designated)

An operation performed when the CRT 4 is used as the display unit and the application program designates 9-dot character display mode will be described under an assumption that the horizontal panning value is 6.

The CPU 1 sets in the display control register 14 that the display unit is the CRT 4, that the display characters are 9-dot characters, and that the horizontal panning value is 6. The CPU 1 writes the character codes of characters to be displayed in the character code memory 13. The character code memory 13 sequentially addresses the font memory 11 with the stored character codes to generate character patterns. The font memory 11 supplies generated 8-bit pattern data to the font register 16 and the 7th bit of this data to the display attribute register 17. The font register 16 supplies the supplied 8-bit pattern data to the selector 18.

The character code from the character code memory 13 is supplied to the decoder 12 as well. The decoder 12 decodes the character code, discriminates whether the display character is a graphic character, and supplies attribute data indicating whether the display character is a graphic character or not to the display attribute register 17. In response to the attribute data from the decoder 12, the display attribute register 17 fetches the 7th bit of the 8-bit pattern data supplied from the font memory 16 when the display character is a graphic character, and fetches predetermined data corresponding to the space when the display character is not a graphic character.

The counter control circuit 20 outputs "6" (see FIG. 4B) as the initial value PS on the basis of the data held by the display control register 14, as shown in FIG. 4A, and supplies the load signal L to the counter 19.

The counter 19 fetches the initial value PS in response to the load signal L. Subsequently, the counter 19 updates the counter value CD like 7, 8, 0, 1, 2, 3, 4, 5, 6, 7, 8, 0, . . . .

Responsive to the counter value CD, the selector 18 sequentially and selectively outputs data supplied from the font register 16 and the attribute register 17, as shown in FIG. 5. As a result, the selector 18 sequentially outputs 9 dots supplied from both the font and attribute registers 16 and 17.

The switching circuit 22 supplies to the operating CRT 4 data output from the selector 18 in accordance with the data held by the switching control register 21.

In this manner, eighty 9-dot characters are displayed on the CRT 4 having a horizontal resolution of 720 dots per scanning line. At this time, if the display characters are graphic characters, the 8th dot of each character is identical to the 7th dot; if not, the 8th dot of each character represents a background color.

(Operation when the FPD 5 is operating and display of 9-dot characters is designated)

An operation performed when the FPD 5 (having a horizontal resolution of 640 dots) is used as the display unit and the application program or setup program designates 9-dot character display mode will be described under an assumption that the horizontal panning value is 6.

In this case, whereas only 71 characters can be conventionally displayed, 80 characters are displayed in this embodiment by converting the horizontal size of the display character from 9 to 8 bits.

The CPU 1 sets in the display control register 14 that the display characters are 9-dot characters and that the horizontal panning value is 6.

The CPU 1 writes the character codes of display characters in the character code memory 13. The character code memory 13 addresses the font memory 11 with the stored character code to generate a character pattern. The font memory 11 supplies generated 8-bit pattern data to the font register 16 and the 7th bit of this data to the display attribute register 17. The font register 16 supplies the supplied 8-bit pattern data to the selector 18.

The decoder 12 decodes the character code, discriminates whether the display character is a graphic character, and supplies attribute data to the display attribute register 17. In response to the attribute data, the display attribute register 17 fetches the 7th bit of the 8-bit pattern data supplied from the font memory 16 when the display character code represents a graphic character, and fetches predetermined data corresponding to the space when the display character code does not represent a graphic character (however, the selector 18 does not select data fetched in the display attribute register 17, as will be described later).

The counter control circuit 20 outputs "6" as the initial value PS on the basis of the data held by the display control register 14, as shown in FIG. 4C, and supplies the load signal L to the counter 19.

The counter 19 updates the counter value CD like 8, 0, 1, 2, 3, 4, 5, 6, 8, 0, . . . on the basis of data supplied from the counter control circuit 20 and the display control register 14.

Responsive to the counter value CD, the selector 18 sequentially selectively outputs, in units of dots, font data of dot numbers 0 to 7 supplied from the font register 16. However, the selector 18 does not select the 8th dot supplied from the display attribute register 17. The switching circuit 22 supplies to the operating FPD 5 data output from the selector 18 in accordance with the data held by the switching control register 21.

In this manner, eighty 8-dot characters are displayed on the FPD 5 having a horizontal resolution of 640 dots despite that display of 9-dots characters is designated.

(Operation when display of 8-dot characters is designated)

An operation when display of 8-dot characters is designated by the application program will be described under an assumption that the horizontal panning value is 7.

The CPU 1 sets in the display control register 14 that the display characters are 8-dot characters and that the horizontal panning value is 7.

The character code memory 13 sequentially addresses the font memory 11 with the stored character codes to sequentially generate character patterns. The font memory 11 supplies generated pattern data to the font register 16. The font register 16 supplies the supplied pattern data to the selector 18. The decoder 12 decodes a character code supplied from the character code memory 13, discriminates whether the display character is an 8-dot character, and disables the register 17.

The counter control circuit 20 outputs "8" as the initial value PS on the basis of the data held by the display control register 14, as shown in FIG. 4A, and supplies the load signal L to the counter 19. The counter 19 updates the counter value CD like 0, 1, 2, 3, 4, 5, 6, 8, 0, . . . on the basis of data supplied from the counter control circuit 20 and the display control register 14. Responsive to the counter value CD, the selector 18 sequentially selectively outputs font data of dot numbers 0 to 7 supplied from the font register 16. The switching circuit 22 supplies to the operating display unit data output from the selector 18 in accordance with the data held by the switching control register 21.

In this manner, eighty 8-dot characters are displayed on the operating display unit.

As has been described above, in this embodiment, even if the FPD having a horizontal resolution of 640 dots per scanning line is used as the display unit and the application program designates 9-dot character mode, 8-dot characters are actually displayed on the screen. Accordingly, 80 characters are displayed on the screen of the FPD in the horizontal direction to maintain the compatibility with the CRT.

The present invention is not limited to the embodiment described above. In the above embodiment, when the display characters are 9-dot graphic characters, the display attribute register 17 holds the 7th dot of the pattern data supplied from the font memory 11. However, the display attribute register 17 may hold the 7th dot of the pattern data supplied from the font memory 11 only when the 8th dot is enabled by the CPU 1. FIG. 6 shows an arrangement for enabling this operation. Referring to FIG. 6, data held by an enable/disable register 31 is supplied to an enable terminal EN of a display attribute register 17. Accordingly, only when a CPU 1 sets "1" in the enable/disable register 31, the display attribute register 17 holds the 7th dot of the pattern data supplied from a font memory 11; if not, the display attribute register 17 outputs data corresponding to the space.

The above embodiment exemplifies a case in which the horizontal resolution of the CRT is 720 dots per scanning line and that of the FPD is 640 dots per scanning line. However, the present invention can similarly be applied to a system which uses a CRT having a horizontal resolution of 640 dots per scanning line and in which the application program designates 9-dot character mode, and to a system for selectively using FPDs having horizontal resolutions of 640 dots per scanning line and 720 dots per scanning line, respectively.

A display control apparatus having the two terminals T1 and T2 are exemplified in the present invention. However, the present invention can similarly be applied to a display control apparatus in which a CRT and an FPD are selectively connected to one terminal, or to a display control apparatus in which either one of a CRT and an FPD is normally connected to one terminal and the other one is connected to the other terminal as required.

The size of a display character, the resolution of a display unit, and the like are not limited to those described in the above embodiment, but can be modified in various manners. Although the above embodiment has been described in terms of the number of display characters in the horizontal direction, the present invention can similarly be applied to a case in which the identical numbers of characters are to be displayed on display units having different numbers of display characters in the vertical direction.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display control apparatus comprising:

a first terminal for connecting to a CRT display unit having a horizontal resolution of N dots per scanning line where N is a positive integer;

a second terminal for connecting to a flat panel display unit having a horizontal resolution of M dots per scanning line, where M is a positive integer smaller than N;

designating means for designating an operating one of said CRT and flat panel display units;

generating means for generating character codes of characters having a horizontal size of 9 dots, including non-graphic characters and graphic characters to display each of said characters at a predetermined position on at least one of said CRT or flat panel display units, said generating means generating character codes of the non-graphic characters and graphic characters;

a character code memory, connected to said generating means, for storing the character codes generated by said generating means; and converting means, connected to said first and second terminals, said designating means, and said character code memory, for converting the character code stored in said character code memory to dot pattern data having a horizontal size of 9 dots and outputting the dot pattern data to said CRT display unit through said first terminal when said CRT display unit is operating, and for converting the character code stored in said character code memory to dot pattern data having a horizontal size of 8 dots and outputting the dot pattern data to said flat panel display unit through said second terminal when said flat panel display unit is operating, wherein said converting means comprises:

pattern generating means for generating and storing pattern data having a horizontal size of 8 dots based on the character codes, detecting means for detecting whether a character code represents a non-graphic character or a graphic character based on the character codes, a register, connected to said detecting means, for storing a first value as a 1-dot pattern data when said detecting means detects that the character code represents a non-graphic character and storing a second value as the 1-dot pattern data when said detecting means detects that the character code represents a graphic character, selecting means, connected to said designating means, said pattern generating means, and said register, for outputting the 8-dot pattern data stored by said pattern generating means and the 1-dot pattern data stored by said register when said CRT display unit is operating, and for outputting the 8-dot pattern data stored by said pattern generating means when said flat panel display unit is operating, and switching means, connected to said designating means and said selecting means, for supplying output data from said selecting means to one of said first and second terminals connected to an operating one of said CRT and flat panel display units.

2. An apparatus according to claim 1, wherein said register stores 7th-dot data of the 8-dot pattern data stored by said pattern generating means as first pattern data and data corresponding to a space as second pattern data.

3. An apparatus according to claim 1, wherein said apparatus further comprises register control means, connected to said register, for storing a flag, wherein said register stores 7th-dot data of the 8-dot pattern data stored by said pattern generating means as first pattern data and data corresponding to a space as second pattern data when the flag is on, and wherein said register stores data corresponding to the space as the first and second pattern data when the flag is off.

4. An apparatus according to claim 1, wherein said selecting means comprises:

a selector, connected to said pattern generating means and said register, for selecting 1 bit from the 8-bit dot data stored by said pattern generating means and the 1-dot pattern data stored by said register in response to a control signal, and counter means, connected to said selector and said designating means, for outputting a control signal to said selector to convert the 8-bit dot data stored by said pattern generating means and the 1-dot pattern data stored by said register to serial data and to output the serial data when said designating means designates that said CRT display unit is operating, and for outputting a control signal to said selector to convert the 8-bit dot data stored by said pattern generating means to serial data and to output the serial data and to not select the 1-bit dot data stored by said register when said designating means designates that said flat panel display unit is operating.

5. An apparatus according to claim 4, wherein said counter means comprises:

initial value setting means for setting an initial value in accordance with a received panning value corresponding to a shift amount in units of dots for shifting a display screen in the horizontal direction, and a counter for counting starting from the initial value set by said initial value setting means as the initial value, said counter being connected to said selector and said designating means, for outputting a counter value to said selector as the control signal to convert the 8-bit dot data stored by said pattern generating means and the 1-dot data stored by said register to the serial data and to output the serial data when said designating means designates that said CRT display unit is operating, and outputting a counter value to said selector as the control signal to convert the 8-bit dot data stored by said pattern generating means to serial data and to not select the 1-bit dot data stored by said register when said designating means designates that said flat panel display unit is operating.

6. An apparatus according to claim 1, wherein, said generating means includes means for generating character codes of characters having a horizontal size of 8 dots to display the characters having a horizontal size of 8 dots on said first or second display unit, said character code memory stores the character codes of characters having a horizontal size of 8 dots, and said converting means comprises means for converting the character codes of the characters having a horizontal size of 8 dots supplied from said character code memory, to dot pattern data having a horizontal size of 8 dots and outputting the dot pattern data to said first display unit through said first terminal when said first display unit is operating or said second display unit through said second terminal when said second display unit is operating.

7. An apparatus according to claim 1, wherein N is 720 and M is 640.

8. A display control apparatus comprising:

a raster display device for displaying character data;

character code generating means for generating character codes of characters to be displayed on a screen of said display device, the character codes representing graphic and non-graphic characters;

character code storage means for storing the character codes generated by said character code generating means;

font memory means for outputting font data of the characters to be displayed on said screen of said display device in response to the character codes stored in said character code storage means;

font register means, connected to said font memory means, for storing the font data of one character to be displayed on said screen of said display device;

display attribute register means for storing display attribute data designating display attributes of the characters to be displayed on said screen of said display device in response to the character codes stored in said character code storage means; and data transfer means, connected to said font register means and said display attribute register means, for converting part of the font data and the display attribute data to 8-bit serial data and transferring the 8-bit serial data to said display device, when said display device has a horizontal resolution of 640 dots per scanning line, or converting the display attribute data and the font data to 9-bit serial data and transferring the 9-bit serial data to said display device, when said display device has a horizontal resolution of 720 dots per scanning line.

9. A display control apparatus according to claim 8, wherein said characters have a horizontal size of 9 dots when said display unit has a horizontal resolution of 720 dots per scanning line; and wherein display attribute data stored by said display attribute register means includes a part of the font data when said character code is a graphic character.

10. A display control apparatus according to claim 9, wherein said font data has a horizontal size of 8 dots, wherein display attribute data stored by said display attribute register means includes 7th-dot data of the 8-dot font data when said character code is a graphic character, and wherein display attribute data stored by said display attribute register means includes data corresponding to a space when said character code is a non-graphic character.

11. A display control apparatus according to claim 8, wherein said characters have a horizontal size of 8 dots when said display unit has a horizontal resolution of 640 dots per scanning line, and wherein said part of the font data has a horizontal size of 7 dots other than 7th-dot data of 8 font data, and said display attribute data stored by said display attribute register means includes 7th-dot data of the 8-dot font data when said character code is a graphic character.

12. A display control apparatus according to claim 8, wherein said characters have a horizontal size of 8 dots when said display unit has a horizontal resolution of 640 dots per scanning line, and wherein said part of the font data has a horizontal size of 7 dots other than 7th-dot data of 8 font data, and said display attribute data stored by said display attribute register means includes data corresponding to a space when said character code is a non-graphic character.

* * * * *